United States Patent
Bellini et al.

(10) Patent No.: US 10,728,111 B2
(45) Date of Patent: Jul. 28, 2020

(54) DATA MODULE MANAGEMENT AND INTERFACE FOR PIPELINE DATA PROCESSING BY A DATA PROCESSING SYSTEM

(71) Applicant: Accenture Global Solutions Limited, Dublin (IE)

(72) Inventors: Davide Guglielmo Bellini, Cernusco sul Naviglio (IT); Danilo Rizzo, Cologno Monzese (IT); Simone Miraglia, Genoa (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/917,336

(22) Filed: Mar. 9, 2018

(65) Prior Publication Data

US 2019/0280944 A1 Sep. 12, 2019

(51) Int. Cl.
*G06F 16/23* (2019.01)
*H04L 12/24* (2006.01)
(Continued)

(52) U.S. Cl.
CPC ............ *H04L 41/22* (2013.01); *G06F 9/4843* (2013.01); *G06F 16/2379* (2019.01);
(Continued)

(58) Field of Classification Search
CPC ... H04L 41/22; G06F 16/2379; G06F 16/245; G06F 17/271; G06F 3/04842
(Continued)

(56) References Cited

U.S. PATENT DOCUMENTS 7,058,696 B1 * 6/2006 Phillips .................. G06F 16/10
709/217
7,331,039 B1 * 2/2008 Yip ........................ G06F 11/323
715/772
(Continued)

FOREIGN PATENT DOCUMENTS

CN          106156307 A       11/2016
CN          106168909 A       11/2016
(Continued)

OTHER PUBLICATIONS

Q.C. Crea, What is RAID Storage? Mar. 27, 2017; Colocation America; pp. 1-13.*
(Continued)

*Primary Examiner* — Andrew R Dyer
(74) *Attorney, Agent, or Firm* — Harrity & Harrity, LLP

(57) ABSTRACT

A device may receive data from a data source and identify attributes included in the received data. The device may provide, to a user device, a user interface providing user interface elements that enable, by interaction with the user interface elements, selection of at least one attribute, of the attributes, for use by a data module. In addition, the device may receive, from the user device, information identifying the data module, the data module: being configured to process the at least one attribute and defining a function to be performed by a data processing pipeline. Further, the device may activate the data module for use by the data processing pipeline implemented by the device and perform an action on incoming data using the data processing pipeline and the data module.

20 Claims, 6 Drawing Sheets

(51) Int. Cl.
  *G06F 16/245*  (2019.01)
  *G06F 9/48*  (2006.01)
  *G06F 40/211*  (2020.01)
  *G06F 3/0484*  (2013.01)

(52) U.S. Cl.
  CPC .......... *G06F 16/245* (2019.01); *G06F 40/211*
    (2020.01); *G06F 3/04842* (2013.01)

(58) Field of Classification Search
  USPC ................ 715/234, 254, 255, 256, 271, 733
  See application file for complete search history.

(56) References Cited

U.S. PATENT DOCUMENTS

| | | | |
|---|---|---|---|
| 7,543,052 B1 | 6/2009 | Cesa | |
| 7,940,162 B2* | 5/2011 | Shaouy | H04L 67/02 |
| | | | 340/286.01 |
| 9,420,100 B2* | 8/2016 | Bellini | G06Q 10/063 |
| 10,504,048 B2* | 12/2019 | Beck | G06Q 10/0635 |
| 2002/0069227 A1* | 6/2002 | Chidiac | G06F 16/258 |
| | | | 715/248 |
| 2002/0073160 A1* | 6/2002 | Purcell | G06F 16/958 |
| | | | 709/206 |
| 2003/0023874 A1* | 1/2003 | Prokupets | G06F 21/32 |
| | | | 726/4 |
| 2003/0160759 A1* | 8/2003 | Martino | G06F 16/338 |
| | | | 345/157 |
| 2005/0060643 A1* | 3/2005 | Glass | G06F 17/241 |
| | | | 715/205 |
| 2005/0182773 A1* | 8/2005 | Feinsmith | G06Q 10/10 |
| 2006/0112175 A1* | 5/2006 | Sellers | H04L 41/0213 |
| | | | 709/223 |
| 2008/0016081 A1* | 1/2008 | MacMillan | G06F 16/951 |
| 2009/0187511 A1* | 7/2009 | Doornebos | G06Q 40/00 |
| | | | 705/36 R |
| 2010/0153175 A1 | 6/2010 | Pearson et al. | |
| 2011/0099500 A1* | 4/2011 | Smith | G06F 3/0482 |
| | | | 715/771 |
| 2013/0227352 A1 | 8/2013 | Kumarasamy et al. | |
| 2014/0278312 A1 | 9/2014 | Nixon et al. | |
| 2015/0030151 A1* | 1/2015 | Bellini | H04M 3/5175 |
| | | | 379/265.06 |
| 2015/0032477 A1 | 1/2015 | Duncan et al. | |
| 2015/0169525 A1* | 6/2015 | Palm | G06F 16/9558 |
| | | | 715/230 |
| 2016/0110407 A1 | 4/2016 | Studer et al. | |
| 2017/0111335 A1* | 4/2017 | Hibbert | H04L 63/083 |

FOREIGN PATENT DOCUMENTS

| | | |
|---|---|---|
| JP | 2004240664 A | 8/2004 |
| JP | 2014081759 A | 5/2014 |

OTHER PUBLICATIONS

Extended European Search Report for Application No. EP19155215.7, dated Jun. 11, 2019, 7 pages.

* cited by examiner

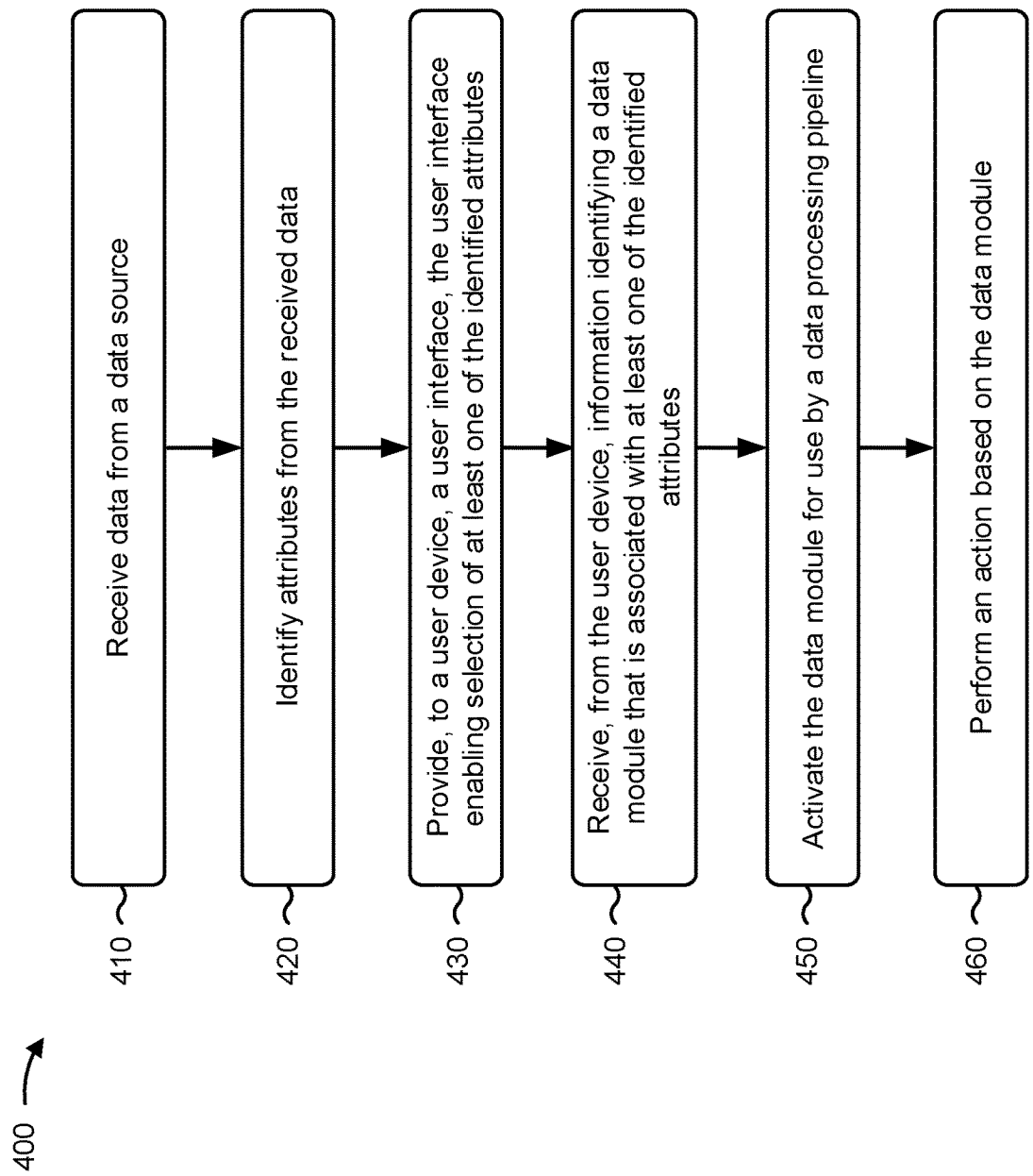

DATA MODULE MANAGEMENT AND INTERFACE FOR PIPELINE DATA PROCESSING BY A DATA PROCESSING SYSTEM

BACKGROUND

Stream processing is a computer programming paradigm that processes data as data is produced or received. Stream processing allows for potentially large amounts of data to be processed (e.g., by an analytics tool) in near real-time. Batch processing involves processing data that may have been collected over time, and may be used (e.g., by an analytics tool) to process a very large amount of data that may take a long time to process and/or does not have to be processed in near real-time.

SUMMARY

According to some implementations, a device may comprise: one or more memory devices; and one or more processors, communicatively connected to the one or more memory devices, to: receive data from a data source; identify attributes included in the received data; provide, to a user device, a user interface, the user interface providing user interface elements that enable, by interaction with one or more of the user interface elements, selection of at least one attribute, of the attributes, for use by a data module; receive, from the user device, information identifying the data module, the data module: being configured to process the at least one attribute, and defining a function to be performed by a data processing pipeline; activate the data module for use by the data processing pipeline implemented by the device; and perform an action on incoming data using the data processing pipeline and the data module.

According to some implementations, a non-transitory computer-readable medium may store instructions, the instructions comprising: one or more instructions that, when executed by one or more processors, cause the one or more processors to: provide, to a user device, a user interface, the user interface providing user interface elements that enable, by interaction with one or more of the user interface elements, selection of at least one attribute that was previously identified as being included in data provided to the one or more processors; receive, from the user device, information identifying a data module, the data module: including an attribute of the at least one attribute, and defining a function to be performed by a data processing pipeline; activate the data module for use by the data processing pipeline implemented by the one or more processors; and perform an action on incoming data using the data processing pipeline and the data module.

According to some implementations, a method may comprise: providing, by a device and to a user device, a user interface, the user interface enabling selection of: at least one attribute previously identified as being included in data provided to the device, and at least one function to be performed by a data processing pipeline; receiving, by the device and from the user device, information identifying a data module that includes: a function of the at least one function, and an attribute of the at least one attribute; activating, by the device, the data module for use by the data processing pipeline implemented by the device; and performing an action based on the data module.

BRIEF DESCRIPTION OF THE DRAWINGS

FIG. 4 is a flow chart of an example process for providing data module management for a data processing system.

DETAILED DESCRIPTION

Figure 1A:
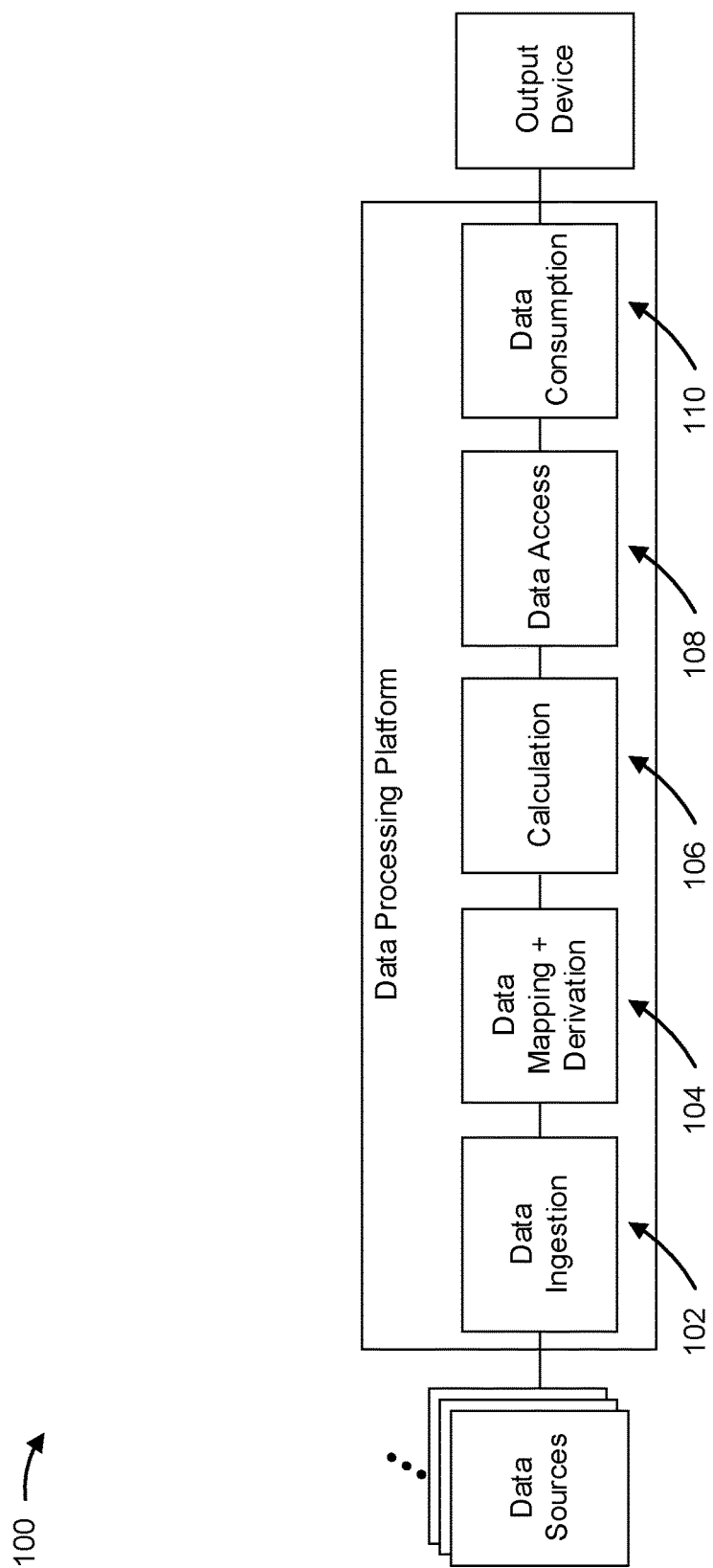
FIGS. 1A-1C are diagrams of an overview of an example implementation described herein.

The following detailed description of example implementations refers to the accompanying drawings. The same reference numbers in different drawings may identify the same or similar elements.

Data processing systems, whether they process data received in a stream and/or in batches of data, enable the performance of a variety of functions. Example functions that may be performed by data processing systems include analytics functions that derive meaningful information and/or patterns from data, key performance indicator (KPI) functions that enable evaluation of performance based on data, computer and network security functions that may identify potential threats from data, and/or the like. While data processing systems are capable of performing a variety of useful functions, significant human and computing resources may be used in obtaining usable attributes from raw data and in designing, configuring, and activating functions to be performed by data processing systems.

Some implementations, described herein, provide a data processing platform capable of identifying, and making available to a user, data attributes associated with incoming batches and/or streams of data. The data processing platform may provide the user with a user interface for enabling the user to define a data module (e.g., data defining functions, attributes, and/or conditions that may be used to process data) using the data attributes, and the data processing platform may use the data module to perform an action based on the data module, such as executing a particular function. By way of example, the data processing platform may receive data from a data source (e.g., error logs from a web server) and identify attributes included in the received data (e.g., each line of an error log file might include a string of characters that includes attributes such as a timestamp, client identifier, and error code). The data processing platform may then provide, to a user device, a user interface that enables a user of the user device to define a data module based on the identified attributes (e.g., the user might define a data module designed to trigger an alarm based on the occurrence of a threshold number of errors that match a particular error code within a particular period of time). After receiving the data module from the user device and via the user interface, the data processing platform may apply the data module (e.g., by storing the data module in a database of data modules that are applied on incoming batches and/or streams of error logs). The data processing platform may then perform an action based on the data module, such as using the data module on incoming data (e.g., in a manner designed to produce an alarm in the event that the conditions specified by the data module are met based on analysis of the incoming error logs).

By obtaining usable attributes from incoming data, providing those attributes to a user, and enabling the quick configuration and activation of data modules in a data processing pipeline, the data processing platform may enable conservation of significant human and computing device resources. For example, the identification of attributes and presentation of a user interface may enable non-technical personnel to create and activate data modules without relying on a data processing developer or other technical expert. In addition, the computing resources that might be used to enable identification of useful attributes from incoming data may be conserved, including processing and data storage resources that would otherwise be used to store and analyze data. The ability to take a data module defined by a user and directly apply the data module to a data processing pipeline may obviate the need for administrator or developer interaction with the data processing platform. Furthermore, the ability to quickly apply the data module and perform the functionality specified by the data module may conserve significant data processing, network, and data storage resources that might otherwise be used to develop a solution for application of the data module and performance of the functionality specified by the data module.

Figure 1B:
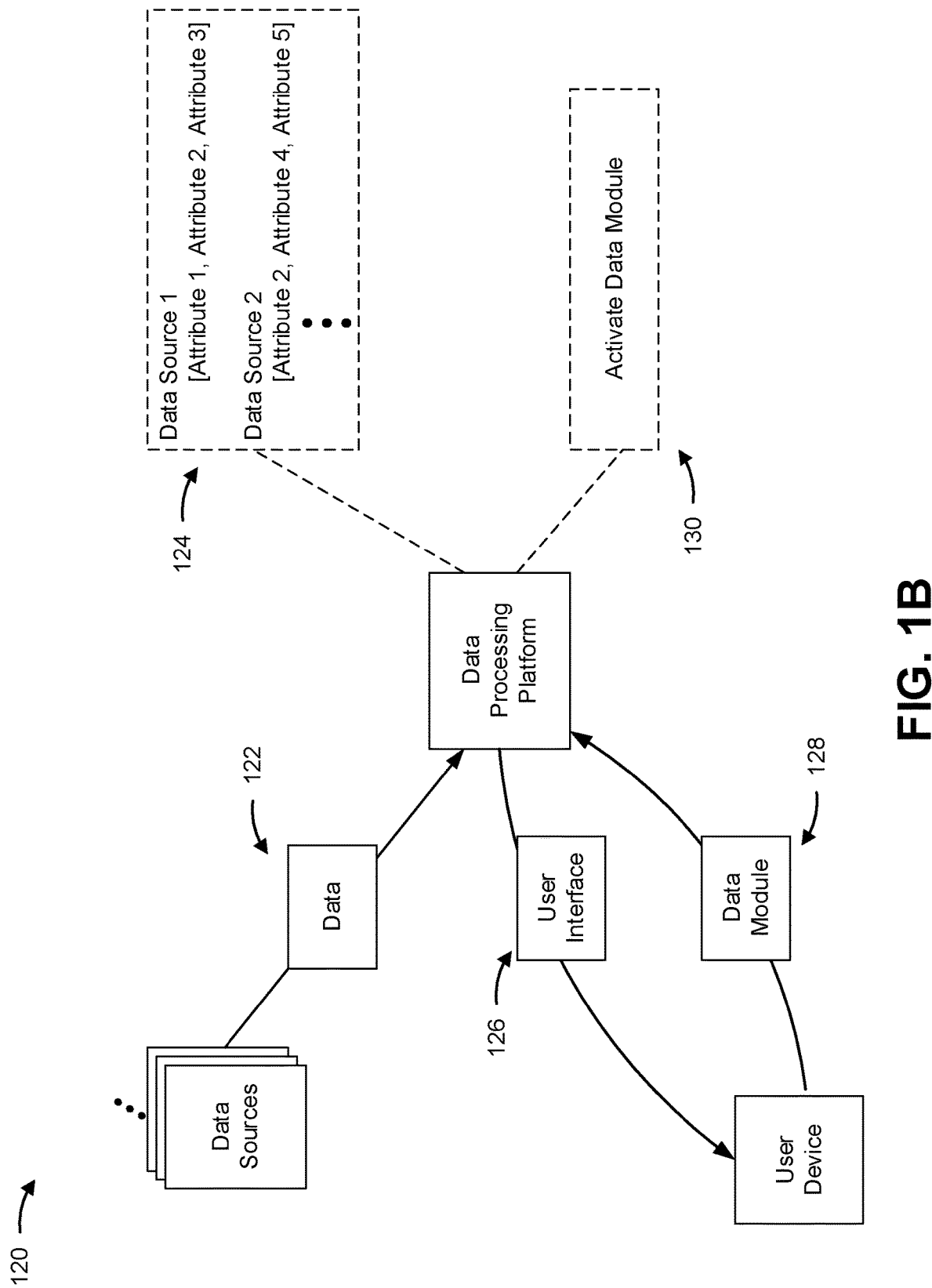
Figure 1C:
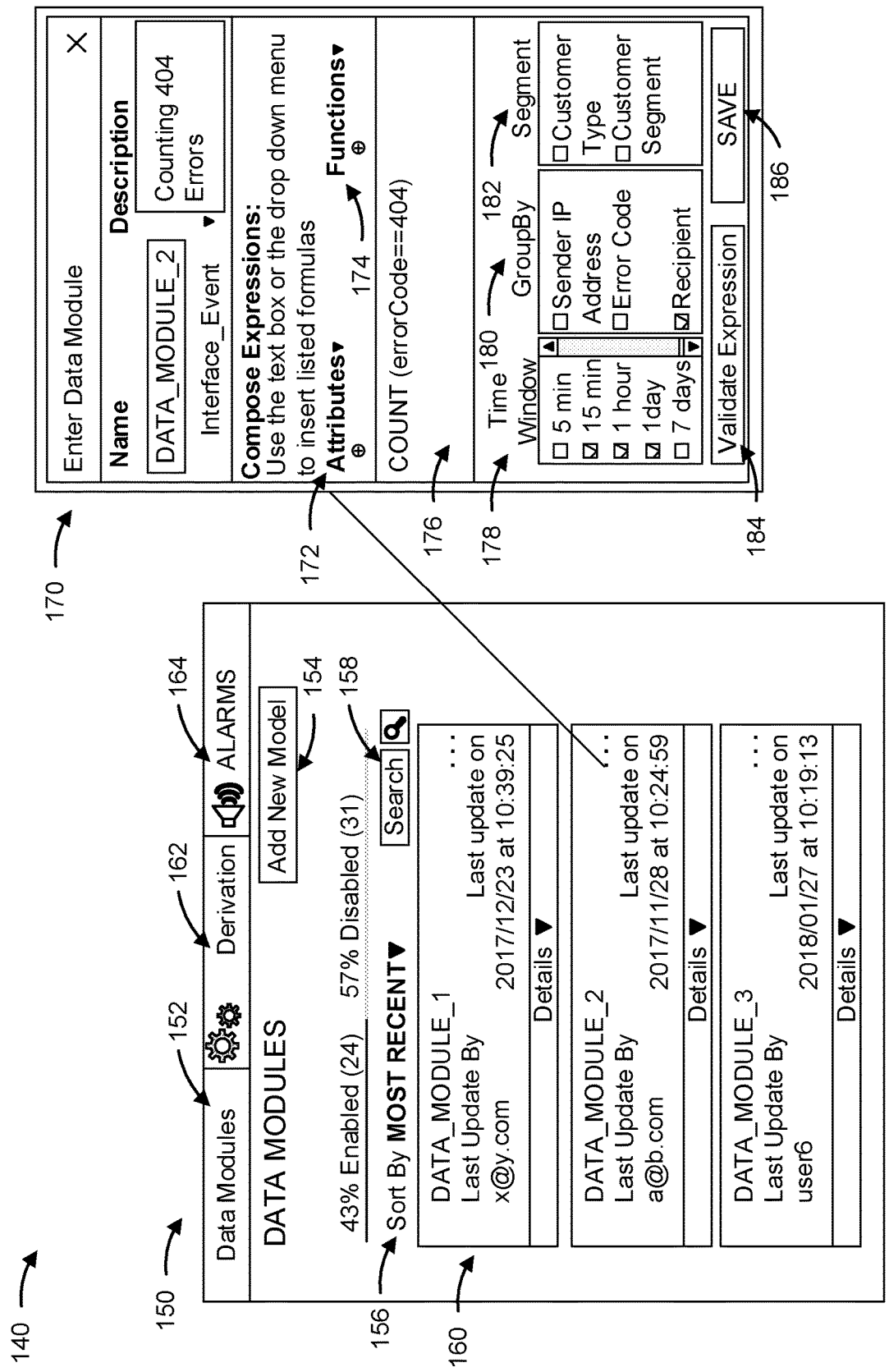

FIGS. 1A-1C are diagrams of an overview of an example implementation 100 described herein. As shown in FIG. 1A, example implementation 100 may include a data processing platform that is capable of performing data processing operations (e.g., analytics, KPI evaluation, network security functions, and/or the like) on incoming data, data sources (e.g., any computing device, such as a personal computer, server computer, and/or the like that is capable of providing data to the data processing platform), and an output device (e.g., a mobile phone, personal computer, server computer, and/or the like) that may, in some implementations, receive output from the data processing platform.

As further shown in FIG. 1A, the data processing platform may include a data ingestion portion 102, a data mapping and derivation portion 104, a calculation portion 106, a data access portion 108, and a data consumption portion 110. In some implementations, the data processing platform may effectuate a data processing pipeline, where various actions are performed based on the incoming data and the actions specified in data modules to be executed by the data processing platform. For example, the data mapping and derivation portion 104 may perform actions based on incoming data received from the data ingestion portion 102, the calculation portion 106 may perform actions based on incoming data received from the data mapping and derivation portion 104, the data access portion 108 may perform actions based on incoming data received from the calculation portion 106, and the data consumption portion 110 may perform actions based on incoming data received from the data access portion 108.

In some implementations, the data ingestion portion 102 of the data processing platform pipeline is responsible for receiving data from various data sources. For example, the data ingestion portion 102 may receive the data in a stream or batch format. In some implementations, the data may include text-based data that the data processing platform may use to perform some action (e.g., analytics, KPI evaluation, security analysis, and/or the like). For example, the data may include error logs, network traffic data, computer security logs, advertising metrics, sales information, and/or the like.

In some implementations, the data mapping and derivation portion 104 is responsible for parsing received data, identifying attributes included in the received data, mapping portions of the received data to data modules and, in some implementations, deriving data models, or enriching the data. For example, the received data may include a line of text, and the data processing platform may parse the line of text to identify attributes included in the text, such as an error code, a device identifier, a timestamp, and/or the like. In addition, the attributes may be mapped to data modules that make use of the attributes in the performance of one or more functions. In some implementations, the received data may be enriched by obtaining related information from third party sources. For example, a device identifier received from one source may be associated with other attributes that are available from a different source, and the data processing platform may enrich the original data set (e.g., the device identifier attribute) with attributes obtained from the different source, and the combined attributes may be mapped to one or more data modules. Additionally, or alternatively, the data processing platform may derive a data model based on one or more other data models (e.g., where data exists that could be applied to multiple data models, a data model may be derived by combining existing data modules through functions). By way of example, the data processing platform may identifying multiple models to which received data could be mapped and derive a single data model by combining the multiple data models.

In some implementations, the calculation portion 106 is responsible for performing the calculations and/or other functionality associated with one or more data modules. For example, the calculation portion 106 may perform analytics, evaluate KPIs, identify security events and anomalies, and/or the like, e.g., in accordance with the function or functions specified in the data modules. By way of example, a data module may specify that, for incoming communications logs, a communications latency metric should be averaged, grouped by network device identifier, and sorted by average latency; in this example, the calculation portion 106 may be responsible for performing the averaging, grouping, and/or sorting of the data.

In some implementations, the data access portion 108 is responsible for providing access to data used and produced by the data processing platform. For example, the data access portion 108 may enable access to raw input data stored by the data processing platform, access to data modules, access to the results of calculation (e.g., the data resulting from execution of one or more data modules), and/or the like.

In some implementations, the data consumption portion 110 is responsible for communications external to the data processing platform. For example, the data consumption portion 110 may be responsible for providing output (e.g., to an output device), including reporting and notification data, enabling real-time monitoring, and/or the like.

As shown in FIG. 1B, example implementation 120 may include a data processing platform, data sources, and a user device (e.g., a mobile phone, a personal computer, a server computer, and/or the like). Similar to example implementation 100, the data processing platform is capable of performing data processing operations (e.g., analytics, KPI evaluation, network security functions, and/or the like) on incoming data, and the data sources (e.g., any computing device, such as a personal computer, server computer, and/or the like) are capable of providing data to the data processing platform. As shown, the user device is capable of communicating with the data processing platform, via a user interface, to create and/or activate a data module.

As further shown in FIG. 1B, and by reference number 122, the data processing platform may receive data from the data sources. For example, the data may include error logs, network traffic data, computer security logs, advertising metrics, sales information, and/or the like. As shown by reference number 124, the data processing platform may parse the received data to identify, for a variety of data sources, attributes included in the data provided by the data sources. For example, the data processing platform may identify attribute 1, attribute 2, and attribute 3 associated with data source 1, and may identify attribute 2, attribute 4, and attribute 5 associated with data source 2, as shown.

As further shown in FIG. 1B, and by reference number 126, the data processing platform may provide a user interface for use by the user device. The user interface may cause a variety of information to be displayed by the user device, e.g., in a manner designed to enable the user of the user device to create a new data module or operate upon an existing data module for use by the data processing platform. For example, the user interface may enable a user to generate, edit, delete, activate, or deactivate a data module, and may provide the user with data identifying multiple attributes associated with the data provided by the various data sources, enabling the user to generate a data module based on the attributes and pre-built functions for processing data.

As further shown in FIG. 1B, and by reference number 128, the data processing platform may receive, from the user device, a data module. For example, the data module may include one or more attributes, functions, and/or conditions that may be used by the data processing platform to produce some form of output based on input data that maps to the data module.

As further shown in FIG. 1B, and by reference number 130, the data processing platform may use the data module received from the user device. For example, the data processing platform may store the data module in a database of data modules that are used during the mapping portion of the data processing platform pipeline. Using the data module, the data processing platform may perform one or more actions based on the data module, such as executing the data module, which may include mapping input data to the data module, performing calculations based on the data module, providing output based on the data module, and/or the like.

As shown in FIG. 1C, example implementation 140 may include an example user interface, which may be provided by the data processing platform to enable a user of a user device to create and/or apply a data module to be used by the data processing platform. For example, example implementation 140 may include data module management interface 150 and may include an interface to edit a data module 170.

As further shown in FIG. 1C, and by reference number 152, data module management interface 150 may include an interface element "Data modules" (shown as selected) enabling a user to manage data modules. As shown by reference number 154, data module management interface 150 may include a button enabling a user to add a new data module. As shown by reference number 156, data module management interface 150 may include a drop-down menu enabling a user to sort data modules (e.g., by most recently created, updated, or activated data module (as shown), by most popular data module, by rating of data module, and/or the like). As shown by reference number 158, data module management interface 150 may include a search box enabling a user to search data modules (e.g., by name, attribute, associated user, and/or the like). As shown by reference number 160, data module management interface 150 may include a selectable list of data modules capable of displaying a variety of information related to the data modules (e.g., the name of the data module, a user associated with the data module, data indicating when the data module was last updated, and/or the like).

As further shown in FIG. 1C, and as shown by reference number 162, data module management interface 150 may include an interface element "Derivation" enabling a user to manage derived data modules (e.g., obtaining additional data modules and/or combining existing data modules through functions). As shown by reference number 164, data module management interface 150 may include an interface element "ALARMS" enabling a user to manage alarms (e.g., notifications that may be triggered based on the occurrence of an event).

As further shown in FIG. 1C, and by reference number 172, the interface to edit a data module 170 may include a drop-down and selector for data attributes, enabling selection of one or more attributes to be included in a data module. As shown by reference number 174, the interface to edit a data module 170 may include a drop-down and selector for functions, enabling selection of one or more functions to be included in a data module. As shown by reference number 176, the interface to edit a data module 170 may include a text box enabling a user to manually provide data module information. In this example implementation 140, the text box is shown as being auto-populated with an expression that may indicate that this data module (e.g., "DATA_MODULE_2") will perform the COUNT function on incoming data having an error code attribute matching "404". In some implementations, the data module information may be added from the drop-down and selector for attributes, the drop-down and selector for functions, and/or entered/edited manually. In some implementations, a particular data source for the data attributes may also be selectable in the interface to edit a data module 170.

As further shown in FIG. 1C, and as shown by reference number 178, the interface to edit a data module 170 may include a time window selector enabling selection of windows of time for which the data module is to be applied (e.g., 15 minutes, 1 hour, and 1 day, and/or the like). As shown by reference number 180, the interface to edit a data module 170 may include a "group by" selector enabling output data from the data module to be grouped by a particular attribute (e.g., recipient, as shown). As shown by reference number 182, the interface to edit a data module 170 may include a segment selector enabling output to be segmented/separated based on one or more attributes (e.g., customer type, customer segment, and/or the like). As shown by reference number 184, the interface to edit a data module 170 may include a button that, when selected, may cause the data processing platform to validate the data module (e.g., check syntax for errors, ensure attributes are being received, and/or the like). As shown by reference number 186, the interface to edit a data module 170 may include a button that, when selected, may cause the data processing platform to save and apply the data module.

In this way, by obtaining usable attributes from incoming data, providing those attributes to a user, and enabling the quick configuration and activation of data modules in a data processing pipeline, the data processing platform may enable conservation of significant human and computing device resources. For example, the identification of attributes and presentation of a user interface may enable non-technical personnel to create and activate data modules without relying on a data processing developer or other technical expert. In addition, the computing resources that might be used to enable identification of useful attributes from incoming data may be conserved, including processing and data storage resources that would otherwise be used to store and analyze data. The ability to take a data module defined by a user and directly apply the data module to a data processing pipeline may obviate the need for administrator or developer interaction with the data processing platform. Furthermore, the ability to quickly apply the data module and perform the functionality specified by the data module may conserve significant data processing, network, and data storage resources that might otherwise be used to develop a solution for application of the data module and performance of the functionality specified by the data module.

As indicated above, FIGS. 1A-1C are provided merely as examples. Other examples are possible and may differ from what was described with regard to FIGS. 1A-1C. For example, the data processing pipeline described with regard to implementation 100 of FIG. 1A may be configured differently (e.g., additional and/or different portions of the data processing pipeline may be used, not used, combined, and/or the like); the implementation 120 described with regard to FIG. 1B may include additional operations, fewer operations, and/or different operations; and/or the user interface described with regard to implementation 140 of FIG. 1C may be configured differently (e.g., additional and/or different user interface elements in a different arrangement, and/or the like).

Figure 2:
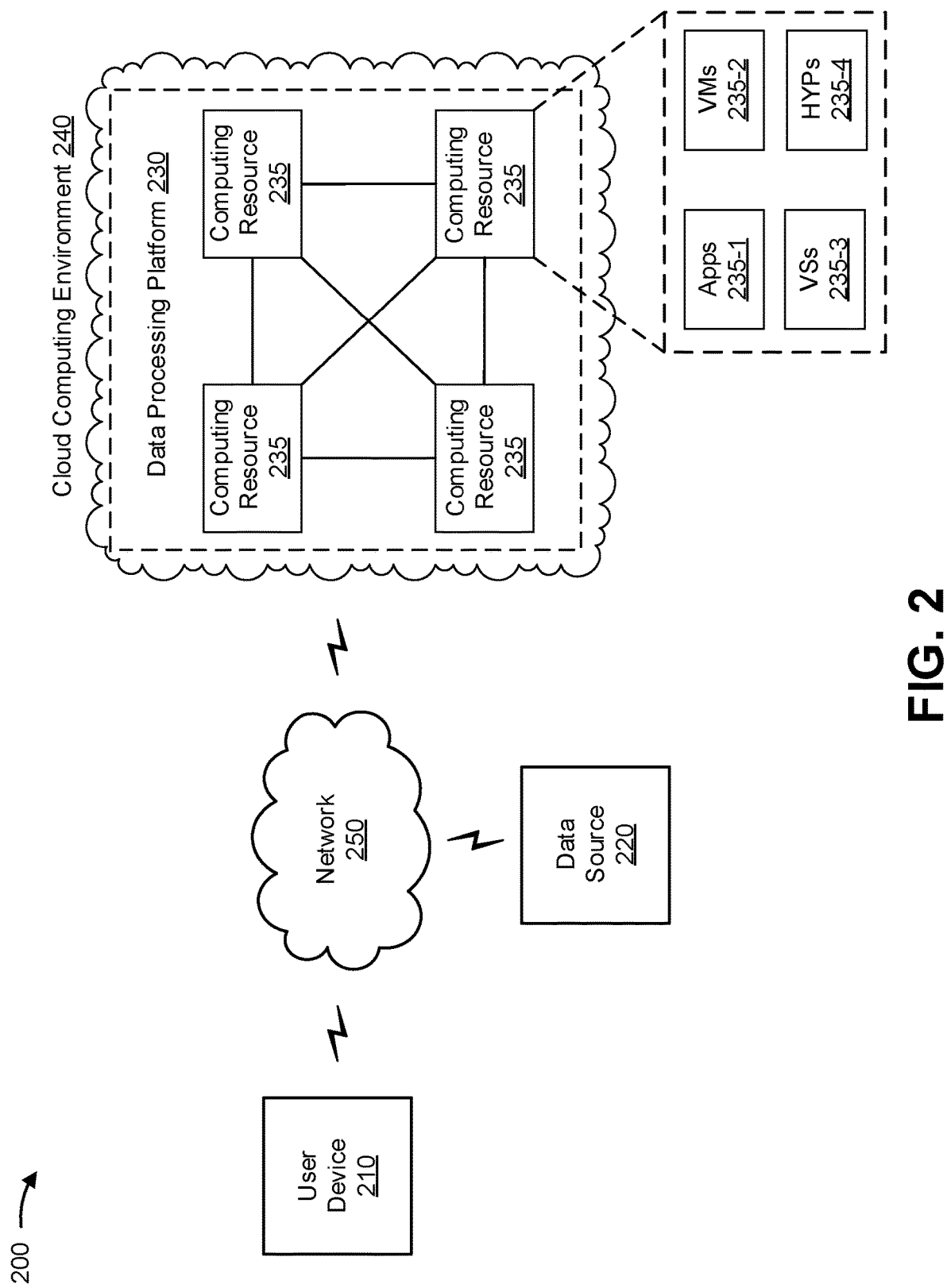
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data source 220, a data processing platform 230, computing resources 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with data modules. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device may include one or more applications designed to enable user device 210 to communicate with data processing platform 230 via network 250 and to present a user interface on a display of user device 210, such as a web browsing application, console application, application designed to communicate with data processing platform 230, and/or the like.

Data Source 220 includes one or more devices capable of receiving, generating, storing, processing, and/or providing information associated with data (e.g., including batches and/or streams of data). For example, data source 220 may include a communication and/or computing device, such as a desktop computer, a server device, a group of server devices, a cloud computing device, a network device, a data center device, or a similar type of device. The data source 220 may be capable of providing (e.g., via network 250) a variety of data to data processing platform 230, enabling data processing platform 230 to process the data.

Data processing platform 230 includes one or more devices capable of receiving, generating, storing, processing, and/or providing information associated with user data and data modules. For example, data processing platform 230 may include a server device (e.g., a host server, a web server, an application server, etc.), a data center device, or a similar device. Data processing platform 230 is capable, for example, of receiving data from data source 220, identifying attributes included in the received data, providing a user interface specifying the attributes to user device 210, receiving information regarding a data module from user device 210, and processing the data received from data source 220 based on the data module.

In some implementations, as shown, data processing platform 230 may be hosted in cloud computing environment 240. Notably, while implementations described herein describe data processing platform 230 as being hosted in cloud computing environment 240, in some implementations, data processing platform 230 might not be cloud-based (i.e., may be implemented outside of a cloud computing environment) or might be partially cloud-based.

Cloud computing environment 240 includes an environment that delivers computing as a service, whereby shared resources, services, etc. may be provided to data processing platform 230. Cloud computing environment 240 may provide computation, software, data access, storage, and/or other services that do not require end-user knowledge of a physical location and configuration of a system and/or a device that delivers the services.

Computing resource 235 includes one or more personal computers, workstation computers, server devices, or another type of computation and/or communication device. In some implementations, computing resource 235 may host data processing platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with data processing platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
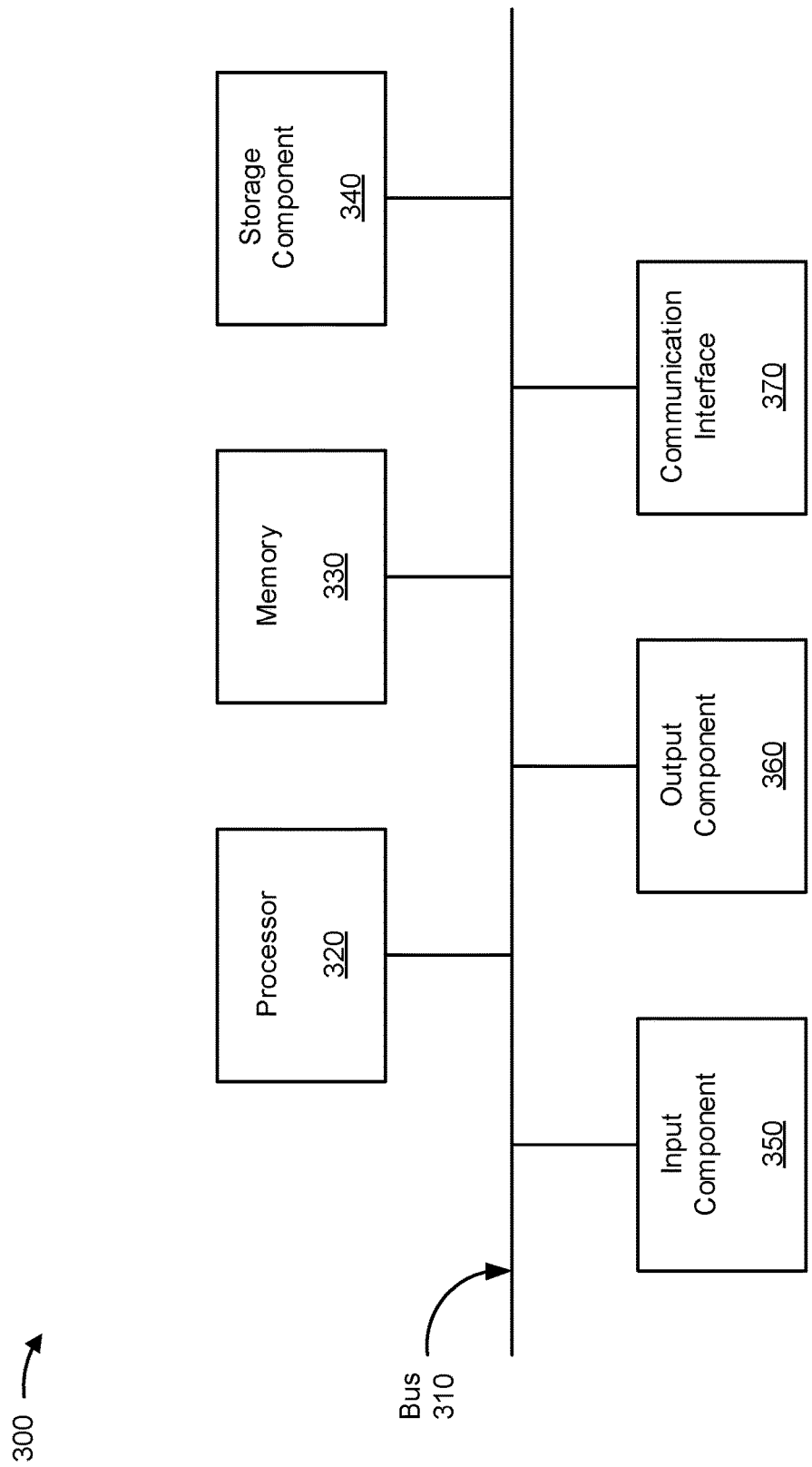
FIG. 3 is a diagram of example components of one or more devices of FIG. 2.

FIG. 3 is a diagram of example components of a device 300. Device 300 may correspond to user device 210, data source 220, data processing platform 230, and/or computing resource 235. In some implementations, user device 210, data source 220, data processing platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing data module management for a data processing system. In some implementations, one or more process blocks of FIG. 4 may be performed by data processing platform 230. In some implementations, one or more process blocks of FIG. 4 may be performed by another device or a group of devices separate from or including data processing platform 230, such as user device 210 and/or data source 220.

As shown in FIG. 4, process 400 may include receiving data from a data source (block 410). For example, data processing platform 230 may receive (e.g., via input component 350 and/or communication interface 370) network data from a network data source 220. In some implementations, the data may be received in batch form (e.g., batches of data that might include multiple data records or multiple lines of text associated with multiple data records) and/or stream form (e.g., a stream of text that may be provided, for example, as the text is produced by data source 220). In some implementations, the information included in the data may vary, and may depend on the data source 220 that provides the data. For example, the data may include error logs, network traffic data, computer security logs, advertising metrics, financial records, and/or the like.

In some implementations, data processing platform 230 may receive data based on a request sent to data source 220 or an entity associated with data source 220. For example, data processing platform 230 may request a batch of data from data source 220 and receive, in response to the request, the requested batch of data. In some implementations, data processing platform 230 may receive data that is from the data source 220 without sending a request (e.g., data that is pushed to data processing platform 230). For example, data source 220 may be configured to stream data to data processing platform 230 as the data is received or produced by data source 220 (i.e., in real time or near real time).

By way of example, data processing platform 230 may receive data, such as a stream of error logs, from data source 220, which may be a server device that manages error logs for a network service provider. In this situation, the stream of error logs may be received by data processing platform 230 as a periodic and/or continuous stream of text. Continuing with the example, the text may represent a variety of information. For example, in this situation, the text may include network device identifiers, error codes, latency values, geo-location data, and/or the like.

In this way, data processing platform 230 may receive data from a data source, which may enable data processing platform 230 to identify attributes from the received data. Additionally, receiving data may enable data processing platform 230 to map incoming data to one or more data modules.

As further shown in FIG. 4, process 400 may include identifying attributes from the received data (block 420). For example, data processing platform 230 may (e.g., using computing resource 235, processor 320, memory 330, and/or storage component 340) identify attributes from the received data. In some implementations, an attribute may include a value that is included in the received data and that represents a characteristic associated with the received data. For example, data received by data processing platform 230 may include one or more strings of text, and data processing platform 230 may identify attributes included in the text by determining the characteristics associated with at least a portion of the text. In some implementations, data processing platform 230 may identify attributes included in the received data, for example, by using information provided by the data source 220 that provided the data, metadata associated with the received data, and/or analytics to parse the received data, and may map portions of the received data to their corresponding attributes.

By way of example, an error log received by data processing platform 230 may include a string such as "123.456.78.90_404_010120180830EST_98.76.543.210." In this situation, data processing platform 230 may parse the string, separate portions of text (e.g., by underscores in this example), and may associate the portions of text with corresponding attributes. Continuing with the example, based on the above string, data processing platform 230 may generate the attributes: Internet protocol (IP) address of sender, network error code, timestamp, and recipient IP address. As noted above, data processing platform 230 may identify the attributes based on information provided by data source 220, metadata included in the data (e.g., header data specifying the attributes), and/or analytics (e.g., pattern-based recognition).

In some implementations, data processing platform 230 may map attributes identified from the received data to one or more data modules. For example, a data module may make use of some or all of the attributes (e.g., "IP address of sender, network error code, timestamp, recipient IP address") to perform one or more calculations and/or perform one or more other actions. As a particular example, a particular data module may be configured to trigger an alarm in response to more than 10 errors associated with a particular error code occurring within a particular window of time from a single recipient device. In this situation, data processing platform 230 may map three of the attributes shown above (e.g., network error code, timestamp, and recipient IP address) to the particular data module.

In some implementations, data processing platform 230 may map attributes to multiple data modules. For example, multiple data modules may make use of the same or similar attributes (e.g., the same attributes could be used for more than one data module, enabling different calculations and/or different outputs based on the same input data). In addition, data processing platform 230 may map different attributes from one set of data to different data modules (e.g., an error code may go to one data module, an IP address of the sender may go to another data module, and/or the like).

In some implementations, data processing platform 230 may enrich data that is mapped to a data module using data received from one or more other data sources 220. By way of example, data processing platform 230 may receive logs (e.g., such as the logs described above), and enrich attributes associated with those logs by identifying related attributes, such as data from a different source that might identify an application associated with the sender and/or recipient devices. The attributes may be enriched, for example, for use by a data module that might make use of attributes from different data sources (e.g., a data module that uses an IP address and an error code from a first data source, and an application identifier from a second data source).

In this way, data processing platform 230 may identify attributes from the received data, enabling data processing platform 230 to map attributes to data modules, which data processing platform 230 may later use for performing a variety of actions based on the data modules. In addition, identifying attributes may enable data processing platform 230 to provide data identifying attributes to user device 210 via a user interface, enabling a user of user device 210 to configure a data module using the user interface.

As shown in FIG. 4, process 400 may include providing, to a user device, a user interface, the user interface enabling selection of at least one of the identified attributes (block 430). For example, data processing platform 230 may (e.g., via computing resource 235, processor 320, output component 360, and/or communication interface 370) provide, to user device 210, a user interface. In some implementations, the user interface may enable the selection and/or modification of at least one of the identified attributes (e.g., the attributes identified at block 420) to create an updated data module. The user interface may be provided in a variety of ways, and may depend on the type of user device 210 that is in communication with data processing platform 230. For example, the user interface may be a text-based console interface, a graphical user interface, a voice-controlled interface, and/or the like. In some implementations, data processing platform 230 may provide the user interface in a manner designed to enable a user of user device 210 to configure a data module to be used by and/or executed by data processing platform 230.

In some implementations, the user interface may provide access to existing data modules. For example, existing data modules may include data modules that have previously been configured, and that a user (e.g., via the user interface) may activate, deactivate, edit, copy, delete, and/or the like. As a particular example, the user may select a data module to deactivate in a manner designed to stop data processing platform 230 from performing data processing using the selected data module. As another example, the user interface may provide the ability to copy a data module, enabling easier creation of a new data module (e.g., by editing a copy of data module rather than starting from scratch). In some implementations, data processing platform 230 may order the existing data modules based on the age of the data module, by data source, by attributes used, by function used, by most recently applied/performed data module, and/or the like. For example, data processing platform 230 may include, in a list of existing data modules, existing data modules that are ordered based on the number of attributes included in the data modules.

In some implementations, the user interface may provide the ability to search and sort existing data modules. For example, the user interface may allow sorting by most recently created module, by oldest module, by data source, by attributes used, by function used, by most recently applied/performed module, and/or the like. Data modules may be searched, for example, by data module name, user associated with the data module, attributes used in the data module, functions used in the data module, and/or the like. This may enable, for example, a user to quickly identify a data module, conserving computing resources that might otherwise be spent searching for a particular data module. In addition, the ability the filter data modules may conserve computing resources that would otherwise be used to process a larger set of data modules.

In some implementations, the user interface may provide the ability to select, using the user interface, a variety of attributes, functions, and/or the like, to edit or create a data module. For example, the user interface may provide, for a new or existing data module, a variety of selectable attributes, functions, time windows, groupings, and/or the like. In some implementations, the selectable attributes may enable a user of user device 210 to select, using the user interface, which attribute(s) may be used for a data module. In some implementations, the selectable functions may enable a user to select, using the user interface, which function(s) (e.g., analytics functions, KPI functions, security functions, and/or the like) should be executed when data processing platform 230 processes data using the data module. In some implementations, the selectable time windows may enable the user to select one or more windows of time within which data timestamps (e.g., timestamps received from data source 220 and/or timestamps applied to data by data processing platform 230 upon receipt of the data) must fit to be included in the processing of the data module (e.g., execute the data module on data received in real-time or near real time, as the data is received, perform the data module on windows of data, such as 5 minute time windows, 15 minute time windows, 1 hour time windows, and/or the like). In some implementations, selectable groupings may enable the user to select, using the user interface, the manner in which output data produced by the data module may be grouped (e.g., grouped by a particular attribute or attributes, time windows, and/or the like). In this way, by providing to a user, via the user interface, a variety of options for configuring a data module, data processing platform 230 provides the user the ability to, using user device 210, easily manage data modules that may be applied and/or executed by data processing platform 230.

By way of example, given the example attributes above (e.g., IP address of sender, network error code, timestamp, recipient IP address, and recipient application), a user interface provided by data processing platform 230 may enable a user (e.g., via user device 210) to create a data module that can be executed (e.g., by data processing platform 230) to count error codes of a particular type, in 5 minute windows, and output the count of those error codes grouped by the recipient IP address. In this example, the attributes used may include: error codes to determine if the error code matches a particular type, timestamps to determine which error codes occurred within a selected window of time, and a recipient IP address by which to group the output of the data module. For example, a data module configured in the manner described above may cause data processing platform 230 to provide, every 5 minutes, output grouped by recipient IP address, the output indicating a count of the number of error logs received by data processing platform 230 that include the particular error code.

In some implementations, the user interface provided by data processing platform 230 may enable the configuring of one or more alarms associated with one or more data modules. For example, an alarm may be configured to alert a particular entity (e.g., a particular user device 210) based on the occurrence of a particular event, such as one or more conditions specified in a data module being met. For example, in the above example data module, an alarm may be configured that alerts user device 210 in response to the occurrence of more than 50 errors of the particular type being associated with a single recipient IP address within the 5 minute time window.

In some implementations, the user interface may include a textual input portion enabling the user to provide manual data module configuration details. For example, a textual input portion may enable the user to provide custom data module expressions, including attributes, Booleans expressions, conditional expressions, and/or the like. This may enable a user to provide custom data modules that might otherwise be difficult to configure, or in a manner that might be faster than using other elements of the user interface (e.g., in a situation where the user may wish to copy and paste a data module obtained from another source into the textual input portion of the user interface, rather than use other user interface elements to build the data module).

In some implementations, the user interface may include an option for data processing platform 230 to validate a data module. For example, in a situation where a user creates or edits a data module, data processing platform 230 may validate the data module in a manner designed to ensure that the data module is free from errors and can be applied to the data processing pipeline without issue. This may include, for example, checking data module syntax, checking that the attributes included in the data module are available from existing data sources, checking that the functions selected for the data module are available, and/or the like. In a situation where validation fails, data processing platform 230 may provide data notifying the user of the failure (e.g., via the user interface) and, in some implementations, suggest corrections (e.g., syntax corrections, attribute suggestions, and/or the like). In this situation, data processing platform 230 may conserve computing resources that might otherwise be used to run, and possibly rerun, a fault data module.

In this way, data processing platform 230 may provide a user interface to user device 210, enabling data processing platform 230 to provide one or more users with the ability to quickly and easily manage data modules that may be used for processing data by data processing platform 230.

As shown in FIG. 4, process 400 may include receiving, from the user device, information identifying a data module that is associated with at least one of the identified attributes (block 440). For example, data processing platform 230 may (e.g., via computing resource 235, processor 320, input component 350 and/or communication interface 370) receive, from user device 210, information identifying a data module, such as information for a new data module, information identifying a pre-existing data module, information identifying a modified version of a pre-existing data module, and/or the like. The data module may be associated with at least one of the identified attributes (e.g., at least one of the attributes identified at block 420). The data module may be a new data module (e.g., a data module created by a user via user device 210 and user interface provided by data processing platform 230) or a pre-existing data module (e.g., a data module activated or edited from one or more pre-existing data modules).

In some implementations, the information identifying the data module may be received via the user interface provided at block 430. For example, data processing platform 230 may provide a web-based graphical user interface that a user of user device 210 uses to provide, via the user interface, information identifying a data module to data processing platform 230. In some implementations, the information identifying the data module may be received by data processing platform 230 through a channel other than a graphical user interface. For example, information identifying data modules may be provided to data processing platform 230 in a variety of ways (e.g., uploaded to a data storage device for storing data modules, provided via a command line interface, provided in a batch of data modules, and/or the like).

In some implementations, validation of a data module may be performed by data processing platform 230 after receiving the information identifying the data module (e.g., after submission to data processing platform 230 via the user interface or otherwise). In this situation, data processing platform 230 may notify the user regarding a failed validation via the user interface or in another way (e.g., electronic mail, console output, and/or the like).

In this way, data processing platform 230 may receive, from user device 210, a data module that includes one of the identified attributes, enabling data processing platform 230 to apply the data module to the data processing pipeline.

As shown in FIG. 4, process 400 may include activating the data module for use by a data processing pipeline (block 450). For example, data processing platform 230 may (e.g., via computing resource 235, processor 320, memory 330, storage component 340, output component 360, and/or communication interface 370) activate the data module for use by a data processing pipeline. For example, data processing platform 230 may provide the data module to a device implementing a data mapping and derivation portion (or an equivalent portion) of the data processing pipeline. The data processing pipeline may be implemented by data processing platform 230 or, in some implementations, by a different data processing service or platform. In this way, by providing the data module to a device associated with data mapping and derivation, data processing platform 230 may enable the mapping of incoming data to the data module and, in some implementations, enable execution of the data module (e.g., by data processing platform 230).

In some implementations, data processing platform 230 may activate the data module by storing the data module in a database, or other storage device or data structure, that is used by the data mapping and derivation portion of the data processing pipeline. For example, the data mapping and derivation portion of the data processing pipeline may be executed by one or more devices included in data processing platform 230, at least one device being responsible for obtaining data modules from data storage (e.g., from a database). Obtaining the data modules from data storage may be performed periodically, based on a change in the data modules database, and/or the like, and may be performed in a manner designed to ensure that the data modules being used by the data mapping and derivation portion of the data processing pipeline (and other portions of the data processing pipeline) are up to date. By way of example, data processing platform 230 may store data modules in a queue and periodically search the queue for new and/or updated data modules. Responsive to detecting new and/or updated data module, data processing platform 230 may activate the new and/or updated data module.

In some implementations, rather than activating a data module, data processing platform 230 may remove the data module from the data processing pipeline (e.g., delete the data module from the data modules database, deactivate the data module, and/or the like). For example, in a situation where a user of user device 210 deactivates and/or deletes a data module (e.g., via the user interface), data processing platform 230 may delete the data module from a database of data modules and/or flag the data module as being deactivated.

In this way, data processing platform 230 may activate the data module for use by a data processing pipeline, enabling data processing platform 230 to perform one or more actions based on the data module.

As shown in FIG. 4, process 400 may include performing an action based on the data module (block 460). For example, data processing platform 230 may (e.g., via computing resource 235, processor 320, memory 330, storage component 340, output component 360, and/or communication interface 370) perform one or more actions based on the data module. For example, the data module may specify the manner in which data processing platform 230 should process incoming data associated with the data module, the manner in which data processing platform 230 should store data associated with the data module, the manner in which data processing platform 230 should report information associated with the data module, and/or the like. In this situation, data processing platform 230 may perform the actions specified by the data module.

In some implementations, data processing platform 230 may process incoming data based on the data module. For example, data processing platform 230 may perform data mapping and/or derivation based on the data module. In this situation, a data mapping portion of the data processing pipeline may parse received data, identify attributes included in the received data, and map portions of the received data based on the attributes specified by the data module. For example, if the data module requires three attributes, the data mapping portion may obtain (e.g., from one or more data sources 220) incoming data having the specified attributes and map the incoming data to the data module.

In some implementations, data processing platform 230 may perform one or more calculations based on the data module. For example, data processing platform 230 may perform one or more functions specified by the data module on data that was mapped to the data module. In this situation, a calculation portion of the data processing pipeline may perform functions specified by the data module. For example, the calculation portion may perform analytics functions, KPI functions, computer security functions, and/or the like. Using the example data module above (e.g., described in block 430), data processing platform 230 may execute a function to count, in 5 minute windows, error codes of a particular type and group the error codes by recipient IP address. As another example, data processing platform may execute a function designed to identify one or more key performance indicators from network data.

In some implementations, data processing platform 230 may store information based on the data module. For example, data processing platform 230 may perform the data access portion of the data processing pipeline to store data associated with the data module. In this situation, data processing platform 230 may store data used to perform the calculations (e.g., the incoming data) and/or output data from executing the data module at the calculation portion of the data processing pipeline (e.g., output data, such as statistics). Using the example data module above, data processing platform 230 may store error logs used as input for the data module, and store the count of error messages grouped by the recipient IP address.

In some implementations, data processing platform 230 may provide information based on the data module. For example, data processing platform 230 may perform the data consumption portion of the data processing pipeline to provide information based on the results of processing data using the data module. In this situation, the data consumption portion of the data processing pipeline may make data available for user device 210, may notify user device 210, may send alerts to user device 210, and/or the like. As an example, data processing platform 230 may provide data that causes a visual representation of data processing results to be displayed (e.g., at user device 210). In a situation where data processing platform 230 identifies key performance indicators, for example, data processing platform 230 may provide user device 210 with data causing a visual representation of the key performance indicators to appear (e.g., via a web page, electronic mail communications, and/or the like).

In some implementations, data processing platform 230 may provide, based on the data module, data that causes a device to perform an action. For example, data provided by data processing platform 230 may cause a device (e.g., computing device, security device, network device, and/or the like) to power on, boot up, activate, deactivate, power down, execute a program, and/or the like. This may enable, for example, data processing platform 230 to provide at least a portion of a fault recovery service, using a data module executed by the data processing pipeline to detect a problem (e.g., a faulty network device), and sending data that may trigger a solution to the problem (e.g., activating a network device to replace the faulty network device).

In some implementations, data processing platform 230 may cease performing one or more portions of the data processing pipeline based on the data module. For example, in a situation where a data module is deleted or deactivated, data processing platform 230 may stop processing incoming data using the data module, stop performing calculations based on the data module, stop storing information based on the data module, and/or stop providing information based on the data module.

In this way, data processing platform 230 may perform one or more actions based on the data module, enabling data processing platform 230 to use the data module to perform a variety of actions with respect to processing data based on the data module.

By obtaining usable attributes from incoming data, providing those attributes to a user, and enabling the quick configuration and activation of data modules in a data processing pipeline, the data processing platform 230 may enable conservation of significant human and computing device resources. For example, the identification of attributes and presentation of a user interface may enable non-technical personnel to create and activate data modules without relying on a data processing developer or other technical expert. In addition, the computing resources that might be used to enable identification of useful attributes from incoming data may be conserved, including processing and data storage resources that would otherwise be used to store and analyze data. The ability to take a data module defined by a user and directly activate the data module for use by a data processing pipeline may obviate the need for administrator or developer interaction with the data processing platform 230. Furthermore, the ability to quickly use the data module and perform the functionality specified by the data module may conserve significant data processing, network, and data storage resources that might otherwise be used to develop a solution for use of the data module and performance of the functionality specified by the data module.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, data from a network data source;
  identifying, by the device and based on other information previously provided to the device by the network data source, attributes included in the data;
  providing, by the device and to a user device, a user interface,
    the user interface providing user interface elements that enable, by interaction with one or more of the user interface elements, creation of a data module by at least one of modification or selection of:
      at least one attribute of the attributes,
      at least one function to be performed by a data processing pipeline that is separate from the data module,
      at least one condition associated with an attribute of the at least one attribute, and
      at least one time window associated with performance of the at least one function;
  receiving, by the device and from the user device and based on user interaction with the user interface, information identifying the data module, the data module:
    defining a function, of the at least one function, to be performed by the data processing pipeline based on the at least one time window,
    including the attribute, and
    defining a condition of the at least one condition;
  validating, by the device and based on the at least one of the selection or the modification, the data module by determining whether syntax of the data module is accurate,
    the syntax specifying one or more of the at least one function, the at least one attribute, or the at least one condition;
  storing, by the device, the data module in a queue;
  activating, by the device and based on the data module being stored in the queue, the data module for use by the data processing pipeline;
  parsing, by the device, incoming data to identify, in the incoming data, the attribute;
  mapping, by the device, the incoming data to the data module based on identifying, in the incoming data, the attribute; and
  performing, by the device and based on mapping the incoming data to the data module, an action based on the data module, the action comprising performing the function on the incoming data during a time window of the at least one time window.

2. The method of claim 1, wherein performing the action further comprises:
  providing, to a separate device, output data that is:
    based on execution of the data module, and
    specified by the data module,
      wherein the separate device is specified by the data module.

3. The method of claim 1, further comprising:
  deactivating the data module based on input received from the user interface.

4. The method of claim 1, further comprising:
  mapping the incoming data to at least one other data module;
  deriving a new data module based on mapping the incoming data to the at least one other data module,
    the new data module including, from the data module, at least one of:
      the attribute,
      data specifying the condition, or
      data specifying the function, and
    the new data module further including, from the at least one other data module, at least one of:
      at least one other attribute,
      data specifying at least one other condition, or
      data specifying at least one other function; and
  activating the new data module for use by the data processing pipeline.

5. The method of claim 1, wherein mapping the incoming data to the data module comprises:
  determining that the attribute, identified in the incoming data, matches the attribute, as included in the data module.

6. A non-transitory computer-readable medium storing instructions, the instructions comprising:
  one or more instructions that, when executed by one or more processors, cause the one or more processors to:
    receive data from a network data source;
    identify, based on other information previously provided to the one or more processors by the network data source, attributes included in the data;
    provide, to a user device, a user interface,
      the user interface providing user interface elements that enable, by interaction with one or more of the user interface elements, creation of a data module
by at least one of modification or selection of:
at least one attribute of the attributes,
at least one function to be performed by a data processing pipeline that is separate from the data module,
at least one condition associated with an attribute of the at least one attribute, and
at least one time window associated with performance of the at least one function;
validate, based on the at least one of the selection or the modification, the data module by determining whether syntax of the data module is accurate,
the syntax specifying one or more of the at least one attribute, the at least one function, or the at least one condition;
receive, from the user device and based on user interaction with at least one of the one or more of the user interface elements, information identifying the data module, the data module:
including the attribute,
defining a condition of the at least one condition, and
defining a function, of the at least one function, to be performed by the data processing pipeline based on the at least one time window;
store the data module in a queue;
based on the data module being stored in the queue, activate the data module for use by the data processing pipeline;
parse incoming data to identify, in the incoming data, the attribute;
map the incoming data to the data module based on identifying, in the incoming data, the attribute; and
perform, based on mapping the incoming data to the data module, an action on the incoming data using the data processing pipeline and the data module, the action comprising performing the function on the incoming data during a time window of the at least one time window.

7. The non-transitory computer-readable medium of claim 6, wherein the user interface further enables selection of at least one of:
one or more groupings associated with the attribute, or
one or more segments associated with the attribute.

8. The non-transitory computer-readable medium of claim 6, wherein the data module further defines one or more of:
one or more groupings associated with the function, or
one or more segments associated with the function.

9. The non-transitory computer-readable medium of claim 6, wherein the one or more instructions, that cause the one or more processors to perform the action, cause the one or more processors to:
identify one or more key performance indicators.

10. The non-transitory computer-readable medium of claim 9, wherein the one or more instructions further cause the one or more processors to:
provide a visual representation of the one or more key performance indicators.

11. The non-transitory computer-readable medium of claim 6, wherein the one or more instructions, when executed by the one or more processors, further cause the one or more processors to:
evaluate the syntax; and
provide, based on evaluating the syntax, the user device with a notification indicating whether the data module is valid.

12. The non-transitory computer-readable medium of claim 6, wherein the one or more instructions, that cause the one or more processors to map the incoming data to the data module, cause the one or more processors to:
determine that the attribute, identified in the incoming data, matches the attribute, as included in the data module.

13. A device, comprising:
one or more memory devices; and
one or more processors, communicatively connected to the one or more memory devices, configured to:
receive data from a network data source;
identify attributes included in the received data,
wherein the one or more processors, when identifying the attributes included in the received data, are configured to:
identify the attributes included in the received data based on other information previously provided to the device by the network data source;
provide, to a user device, a user interface,
the user interface providing user interface elements that enable, by interaction with one or more of the user interface elements, creation of an updated data module by at least one of selection or modification of:
at least one attribute of the attributes,
at least one function to be performed by a data processing pipeline that is separate from the updated data module,
at least one condition associated with an attribute of the at least one attribute, and
at least one time window associated with performance of the at least one function;
validate, based on the at least one of the selection or the modification, the updated data module by determining whether syntax of the updated data module is accurate,
the syntax specifying one or more of the at least one attribute, the at least one function, or the at least one condition;
receive, from the user device and based on user interaction with at least one of the one or more of the user interface elements, information identifying the updated data module, the updated data module:
including the attribute,
defining a condition of the at least one condition, and
defining a function, of the at least one function, to be performed by the data processing pipeline based on the at least one time window;
store the updated data module in a queue;
based on the updated data module being stored in the queue, activate the updated data module for use by the data processing pipeline implemented by the device;
parse incoming data to identify, in the incoming data, the attribute;
map the incoming data to the updated data module based on identifying, in the incoming data, the attribute; and
perform, based on mapping the incoming data to the updated data module, an action on the incoming data using the data processing pipeline and the updated data module, the action comprising performing the function on the incoming data during a time window of the at least one time window.

14. The device of claim 13, wherein the received data includes at least one string of text.

15. The device of claim 13, wherein:
the network data source is a source of streaming data, and the received data is streamed to the device.

16. The device of claim 13, wherein:
the network data source is a source of batch data, and the received data is received as a batch of data,
the batch of data including a plurality of data records.

17. The device of claim 13, wherein the one or more processors, when identifying the attributes included in the received data, are configured to:
identify the attributes included in the received data based on metadata included in the received data.

18. The device of claim 13, wherein the one or more processors, when identifying the attributes included in the received data, are configured to:
identify the attributes included in the received data based on results of analytics performed on the received data.

19. The device of claim 13, where the one or more processors are further to:
map one of the attributes to the updated data module based on the updated data module being configured to process the one of the attributes.

20. The device of claim 13, wherein the one or more processors, when mapping the incoming data to the updated data module, are to:
determine that the attribute, identified in the incoming data, matches the attribute, as included in the updated data module.

* * * * *